United States Patent
He

[19]

[11] Patent Number: 5,915,005
[45] Date of Patent: Jun. 22, 1999

[54] METHOD AND SYSTEM FOR TOLL CHARGE AND RATE INQUIRY SERVICE FOR PORTABLE NUMBERS

[75] Inventor: Jingsha He, San Jose, Calif.

[73] Assignee: MCI Communications Corporation, Washington, D.C.

[21] Appl. No.: 08/862,282

[22] Filed: May 23, 1997

[51] Int. Cl.[6] .......................... H04M 15/00; H04M 3/42; H04M 1/64

[52] U.S. Cl. ....................... 379/115; 379/121; 379/207; 379/67; 379/88

[58] Field of Search .............................. 379/91.01, 91.02, 379/111–119, 121, 127, 133, 134, 207, 219, 220, 221, 229, 230, 67, 88, 89; 455/406, 407, 408

[56] References Cited

U.S. PATENT DOCUMENTS 5,003,584  3/1991  Benyacar et al. ...................... 379/119
5,303,297  4/1994  Hillis ....................................... 379/111
5,572,579  11/1996  Orriss et al. ............................ 379/115
5,699,416  12/1997  Atkins .................................... 379/112

*Primary Examiner*—Paul Loomis

[57] ABSTRACT

A toll charge and rate inquiry service for portable numbers allows a telephone system user to access billing and toll telephone charge information prior to establishing a telephone call connection between the telephone system user and a called party. The telephone toll charge information is extracted from a portable telephone number logical matrix. A telephone system user using the toll charge and rate inquiry service for portable numbers can use the telephone toll charge information to determine prior to establishing a telephone call connection whether to complete the telephone call to the called party with a toll charge. Upon request, the user is automatically connected to the called party.

12 Claims, 2 Drawing Sheets

|  | BILLING INFORMATION | BILLING INFORMATION | BILLING INFORMATION |  | BILLING INFORMATION |
|---|---|---|---|---|---|
| 52 | TELEPHONE NUMBER 1 | TELEPHONE NUMBER 1 | TELEPHONE NUMBER 2 | ... | TELEPHONE NUMBER Y |
|  | TELEPHONE NUMBER 2 | TELEPHONE NUMBER 1 | TELEPHONE NUMBER 2 | ... | TELEPHONE NUMBER Y |
|  | ⋮ | ⋮ | ⋮ | ⋮ | ⋮ |
|  | TELEPHONE NUMBER X | TELEPHONE NUMBER 1 | TELEPHONE NUMBER 2 | ... | TELEPHONE NUMBER Y |

*FIG. 2*

| |
|---|
| CALLED NUMBER |
| CALL DURATION |
| CARRIER |
| PLAN |
| TIME OF DAY |
| DAY OF WEEK |
| PER UNIT RATE |
| TOTAL CHARGE |
| ⋮ |

*FIG. 3*

METHOD AND SYSTEM FOR TOLL CHARGE AND RATE INQUIRY SERVICE FOR PORTABLE NUMBERS

CROSS REFERENCE TO RELATED APPLICATIONS

The subject matter of the present application is related to co-pending U.S. application Ser. No. 08/862,298, titled "Method And System For Providing Immediate Audio Data Response Billing Information To A User", and co-pending U.S. application Ser. No. 08/862,283, titled "Method And System For Determining Optimal Call Periods In Accordance With Caller And Callee Parameters", both filed with the Application hereof on May 23, 1993, both assigned to the assignee hereof, and both of which are herein incorporated by reference.

FIELD OF THE INVENTION

The present invention relates generally to providing telephone billing information to a telephone system user, and more specifically to immediately providing toll charge and rate information in audio or data form to a telephone system user using a automated portable telephone system prior to establishing a toll telephone call connection.

BACKGROUND OF THE INVENTION

The telephone industry currently uses a non-portable numbering system based on the geographic location of the telephone. Currently, a telephone number comprises a three digit area code (NPA), a three digit switch number, and a four digit unique number on that switch. The area code is assigned based on a telephone's geographic location. For instance, Texas currently has eleven area codes assigned by geographic region and population: 210, 214, 281, 409, 512, 713, 806, 817, 903, 915, and 972. In the prior art, since a telephone number was assigned by the telephone's geographic location, a local call could be easily determined by a telephone system user based on the telephone numbers of the caller and the called party. If a telephone system user moved to a new geographic location, he/she had to have a new telephone number assigned.

Pursuant to requirements of the Telecommunications Act of 1996, local telephone carriers are required to provide local telephone number portability in the future. Local number portability refers to the ability of telephone customers to retain, at the same location, existing telephone numbers without impairment of quality, reliability, or convenience when switching from one carrier to another. Local number portability is a significant concern to potential competitors in the local telephone market because service provider portability will determine the practical ability of such providers to compete in the local market without offering very substantial discounts to persuade subscribers to switch to their service. True or universal telephone number portability will follow in the near future. True or universal number portability refers to the ability to have a telephone number that is not associated with a telephone user's geographic location. If a telephone system user with a true or universal portable telephone number moves to a new geographic location, he/she may keep the telephone number so long as both geographic locations are within the United States.

In the prior art, a non-portable telephone numbering system based on the geographic location of the telephone was used. A telephone system user could easily determine a local call based on the telephone numbers of the telephone system user and a called party since it was indicative of the geographic location of the telephone system user and the called party.

With phone number portability, it becomes apparent that the structure of a phone number, specifically the area code (NPA), will lose its geographical meaning. When a number is dialed, the telephone system user may have no idea whether this is going to be a long-distance call that is subject to toll charge because the portable dialed number will not provide any indication to the telephone system user of the geographic location of the called party. A telephone number with a different area code than that of the telephone system user may turn out to be a local call that is not subject to a toll charge. Whereas, a telephone number with the same area code and would be a local call today may belong to a customer thousands of miles away and thus turn out to be a long distance call.

The need for a toll charge and rate inquiry service prior to establishing a telephone call connection has become necessary with the future implementation of portable telephone numbers in the United States. There is thus an unmet need in the art for an automated telephone system to provide toll telephone charge information to a telephone system user using a portable telephone number.

SUMMARY AND OBJECTS OF THE INVENTION

It would be advantageous in the art for a caller dialing a portable telephone number to be able to receive audio toll charge and rate information from an automated telephone system prior to establishing a telephone call connection.

It would be advantageous in the art for a caller dialing a portable telephone number to be able to receive data toll charge and rate information from an automated telephone system prior to establishing a telephone call connection.

Therefore, according to the present invention, an automated telephone toll charge and rate inquiry service for portable numbers allows a telephone system user using a portable telephone number to receive toll charge information. The telephone system user automatically receives toll charge information when a portable telephone number is used prior to establishing a telephone call connection.

A telephone system user accessing the automated telephone toll charge and rate inquiry service for portable numbers can use the toll charge information to determine prior to establishing a telephone call connection whether to complete the telephone call to the called party with a toll charge. The toll charge information is extracted from a portable telephone number logical matrix. Upon request, the telephone system user may receive detailed billing information or may be automatically connected to the called party with a toll charge.

It is accordingly an object of the invention for a caller dialing a portable telephone number to be able to receive audio toll charge and rate information from an automated telephone system prior to establishing a telephone call connection.

It is accordingly a further object of the invention for a caller dialing a portable telephone number to be able to receive data toll charge and rate information from an automated telephone system prior to establishing a telephone call connection.

These and other objects of the invention will become apparent from the detailed description of the invention in which numerals used throughout the description correspond to those found in the drawing figures.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 2 is a data representation of the portable telephone number logical matrix, according to the present invention; and FIG. 3 is a data representation of the billing information database, according to the present invention.

DESCRIPTION OF THE INVENTION

Figure 1:
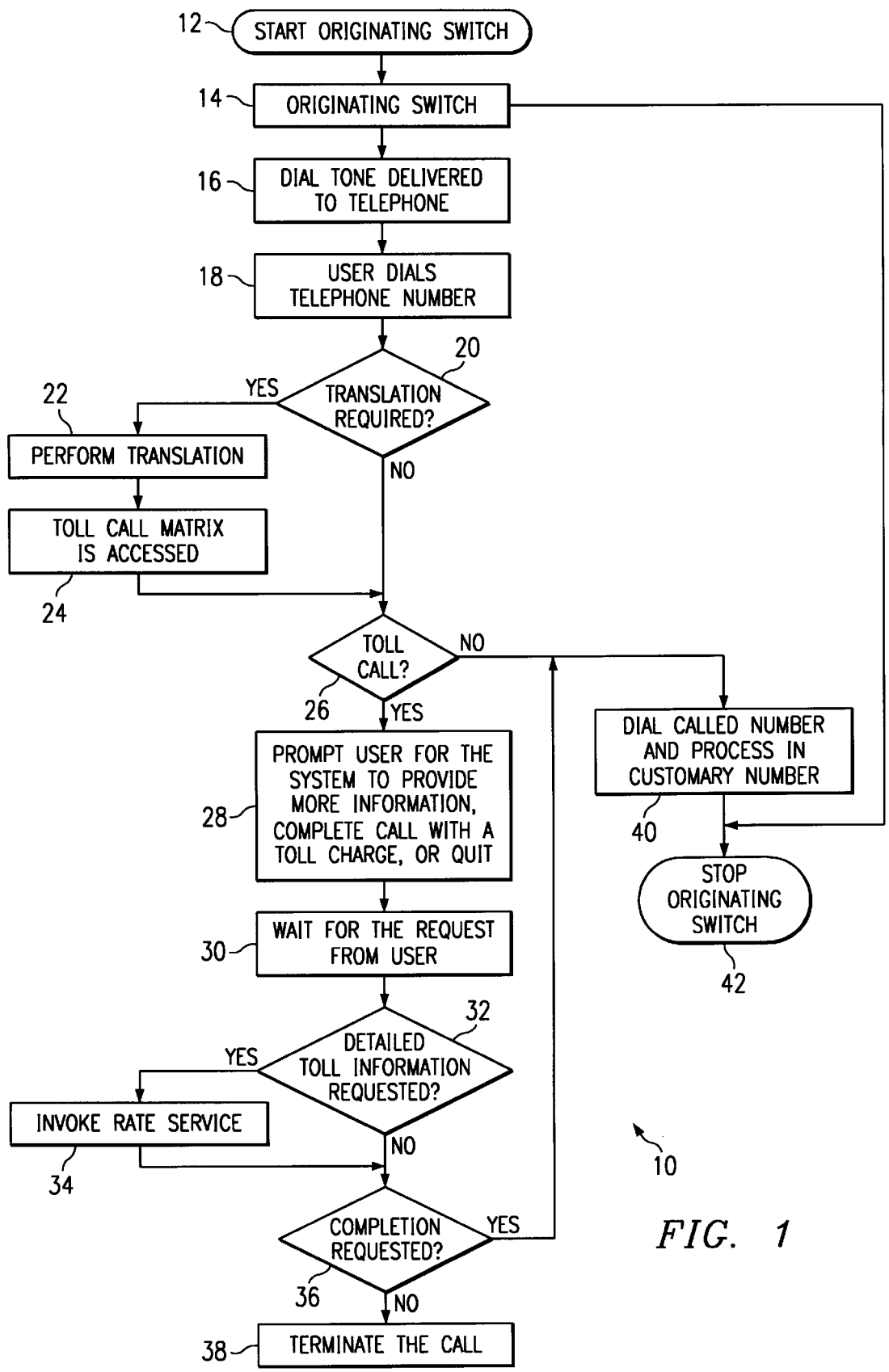
FIG. 1 is a flow chart illustrating the toll charge and rate inquiry service at the originating switch prior to establishing a telephone call connection, according to the present invention.

The present invention describes a method and system for providing toll charge and rate inquiry service for portable numbers to a telephone system user. A telephone system user using an automated portable telephone system is provided toll charge information prior to establishing a telephone call connection where there is a toll telephone charge.

In the present invention, the originating switch provides telephone toll charge and rate information to a telephone system user. By definition, the originating switch is associated with the calling party, since it is the calling party who initiates the telephone call. The terminating switch is associated with the called party who receives the toll telephone call. Once the telephone call is established, the originating switch processes the telephone system user's telephone call connection to the telephone system. The terminating switch processes the called party's telephone call connection to the telephone system.

After the telephone system user picks up the telephone and dials a telephone number, but prior to establishing a telephone call connection, the automated telephone system determines whether there is a toll telephone charge for the telephone number entered by the telephone system user. If there is a toll telephone charge, then the telephone system user is provided toll charge information. Using the telephone toll charge information, the telephone system user may elect to connect the telephone call and process the telephone call normally with toll charges or to terminate the telephone call without paying a toll charge. If there is not a toll telephone charge, then the telephone system is connected to the called party and the telephone call is processed normally without providing toll charge information.

Referring to FIG. 1, a flow chart 10 illustrating the toll charge and rate inquiry service at the originating switch prior to establishing a telephone call connection is shown. The Originating Switch, as shown in Block 14, begins processing the telephone system user's connection when the user picks up the telephone and receives a dial tone prior to establishing a telephone call connection as shown in Block 12. The Originating Switch 14 continues to process the telephone system user's connection until the user hangs up the telephone. The Originating Switch 14, terminates processing the telephone system user's connection when the user hangs up the telephone as shown in Block 42.

After the telephone system user picks up the telephone, the Originating Switch 14 delivers a dial tone to the telephone and the user dials the desired telephone number as shown in Block 16 and Block 18.

Decision Block 20 inquires whether translation of a portable number is required. If yes, then the flow continues to Block 22. If no, then the flow continues to Decision Block 26. The portable telephone number is translated to determine the terminating switch at Block 22. The portable telephone number logical matrix, as shown in FIG. 2, is accessed at Block 24. Toll charge information may be retrieved at Block 24 using either the originating and terminating telephone numbers or the originating and terminating switch. Decision Block 26 inquires whether this is a free local call or a long distance call requiring a toll charge. If this call requires a toll charge, then the user is prompted at Block 28 orally or by data stream for whether to receive detailed toll charge information, complete the telephone call with a toll charge, or terminate without completing the telephone call. The system then pauses for a user response at Block 30. The data stream may be configured to be either for hearing impaired callers or a standard computer signal for computer access. If this call does not require a toll charge, such as a local free call, then the flow continues to Block 40.

Decision Block 32 inquires whether detailed toll information is requested by the user. If yes, then the rate service is invoked and the rate information is extracted at Block 34 as described in co-pending, related patent application, entitled "Method And System For Determining Optimal Call Periods In Accordance With Caller And Callee Parameters", Docket No. RIC-96-055, Ser. No. XXX, filed with the Application hereof on XXX, which is herein incorporated by reference. If no, then the flow continues to Decision Block 36. Decision Block 36 inquires whether the user desires to complete the telephone call with a toll charge. If no, then the telephone call is terminated at the originating switch as shown in Block 38. If yes, then the called party is completed and processed normally at Block 40.

Referring to FIG. 2, a data representation of the portable telephone number logical matrix 50 of the present invention is shown. The portable telephone number logical matrix may be composed of a two dimensional array of telephone numbers. The caller's Telephone Number Record 52 is accessed as a row element of the logical matrix. The called party's telephone number record is accessed as a column element of the caller's Telephone Number Record 52. The billing information for the caller's row and the called party's column is then accessed.

Referring to FIG. 3, a data representation of the billing information database 60 of the present invention is shown. A Billing Record 62 of the billing information database may typically contain the following information: the telephone number called; the total call duration; the carrier for the party paying the toll; any plan information for the party paying the toll; the starting time of the telephone call; day of the week information such as whether this is a weekend or a weekday; the per unit rate such as cost per minute; and the total charge of the telephone call.

The present advantage provides an important advantage over the prior art in that it provides for a user of the telephone system dialing a portable telephone number to access billing information in "real time" prior to establishing a telephone call connection. A caller using the toll charge and rate inquiry service can use the toll charge and rate information to determine whether a call a is free local call or long distance call requiring a toll charge. If the telephone call requires a toll charge, then the caller may elect to continue with the telephone call or to terminate it.

While the invention has been particularly shown and described with reference to a preferred embodiment, it will be understood by those skilled in the art that various changes in form and detail may be made therein without departing from the spirit and scope of the invention.

What is claimed is:

1. A method of immediately providing toll charge information for a portable telephone number on an automated telephone system to a user of the automated telephone system, comprising the steps of:

monitoring an automated telephone system for a telephone number of a called party entered by the user prior to a telephone call connection;

determining whether the telephone number is a portable telephone number;

translating the telephone number if the telephone number is a portable telephone number;

determining whether there is a toll charge for a telephone call between the user and the called party;

providing toll charge information to the user if there is a toll charge for the telephone call; and connecting the user to the called party.

2. The method of claim 1, wherein the step of monitoring an automated telephone system for a telephone number of a called party entered by the user is performed by an originating switch of the toll telephone call.

3. The method of claim 2, wherein the step of connecting the user to the called party comprises connecting the originating switch to a terminating switch, wherein the user is connected to the originating switch and the called party is connected to the terminating switch.

4. The method of claim 1, wherein the step of providing toll charge information to the user is accomplished by reading the toll charge information orally.

5. The method of claim 1, wherein the step of providing toll charge information to the user is accomplished by sending a data communication.

6. The method of claim 5, wherein the data communication is a standard computer signal for computer access.

7. The method of claim 5, wherein the data communication is a data stream for hearing impaired callers.

8. The method of claim 1, wherein the step of connecting the user to the called party comprises the steps of:

providing the user with an option to automatically connect to the called party in accordance with the telephone number entered by the user if there is a toll charge for the telephone call, wherein the user is connected to the called party immediately without providing the user with an option to automatically connect the user to the called party if there is no toll charge for the telephone call;

monitoring the automated telephone system for a connection response entered by the user, wherein the connection response is an affirmative connection response or a negative connection response; and connecting the user to the called party in accordance with the telephone number entered by the user if the connection response entered by the user is an affirmative connection response, wherein the user is not connected to the called party in accordance with the telephone number entered by the user if the connection response entered by the user is a negative connection response.

9. The method of claim 1, wherein the method of immediately providing toll charge information for a portable telephone number on an automated telephone system to the user further comprises the steps of:

providing the user with an option to receive optimal telephone call billing information if there is a toll charge for the telephone call, wherein the user is connected to the called party immediately without providing the user with an option to receive optimal telephone call billing information if there is no toll charge for the telephone call;

monitoring the automated telephone system for an optimal telephone call billing information response entered by the user, wherein the optimal telephone call billing information response is an affirmative connection response or a negative connection response; and providing optimal telephone call billing information to the user if the optimal telephone call billing information response entered by the user is an affirmative connection response, wherein the user is not provided optimal telephone call billing information if the connection response entered by the user is a negative connection response.

10. The method of claim 3, wherein the step of determining whether there is a toll charge for a telephone call between the user and the called party comprises extracting a toll charge information from a portable number logical matrix.

11. The method of claim 10, wherein the toll charge information is extracted from the portable number logical matrix using the originating switch and the terminating switch as indexes of the portable number logical matrix.

12. The method of claim 10, wherein the user has a telephone number and wherein the toll charge information is extracted from the portable number logical matrix using the telephone number of the user and the telephone number of the called party as indexes of the portable number logical matrix.

* * * * *